United States Patent
Lokshin

(10) Patent No.: US 9,497,407 B2
(45) Date of Patent: Nov. 15, 2016

(54) AUTOMATIC SELECTION OF VIDEO FROM ACTIVE CAMERAS

(71) Applicant: AlpineReplay, Inc., Huntington Beach, CA (US)

(72) Inventor: David J. Lokshin, Huntington Beach, CA (US)

(73) Assignee: AlpineReplay, Inc., Huntington Beach, CA (US)

( * ) Notice: Subject to any disclaimer, the term of this patent is extended or adjusted under 35 U.S.C. 154(b) by 0 days.

(21) Appl. No.: 14/562,395

(22) Filed: Dec. 5, 2014

(65) Prior Publication Data

US 2015/0098688 A1   Apr. 9, 2015

Related U.S. Application Data

(63) Continuation of application No. 13/734,818, filed on Jan. 4, 2013, now Pat. No. 8,929,709.

(60) Provisional application No. 61/689,654, filed on Jun. 11, 2012.

(51) Int. Cl.
*H04N 5/77* (2006.01)
*H04N 9/80* (2006.01)
*H04N 9/79* (2006.01)
(Continued)

(52) U.S. Cl.
CPC .......... *H04N 5/77* (2013.01); *G06F 17/30817* (2013.01); *G06K 9/00724* (2013.01); *G11B 20/00* (2013.01); *G11B 27/031* (2013.01); *G11B 27/10* (2013.01); *G11B 27/32* (2013.01); *H04N 9/79* (2013.01); *H04N 9/8205* (2013.01);
(Continued)

(58) Field of Classification Search
CPC ........ G11B 20/00; H04N 5/77; H04N 5/772; H04N 9/79; H04N 9/8205
USPC ........ 386/227, 228, 229, 230, 239, 248, 224
See application file for complete search history.

(56) References Cited

U.S. PATENT DOCUMENTS 8,929,709 B2   1/2015  Lokshin
2005/0223799 A1  10/2005  Murphy
(Continued)

FOREIGN PATENT DOCUMENTS

JP   2001317959   11/2001
JP   2003244691    8/2003
(Continued)

OTHER PUBLICATIONS

International Patent Application PCT/US2013/021122, International Search Report and Written Opinion, Apr. 23, 2013.
(Continued)

*Primary Examiner* — Robert Chevalier
(74) *Attorney, Agent, or Firm* — Greenberg Traurig LLP

(57) ABSTRACT

A method according to one embodiment includes: receiving, by a processing system, sensor data from a sensor device carried by a user or attached to the user's sports equipment during a sporting activity; identifying, by the processing system and based on the sensor data, an event engaged in by the user during a time period; determining, based on the sensor data, a position of the user during the event; identifying a camera that is operational and has the user in view during at least a portion of the time period; and selecting video footage of the event from the identified camera.

19 Claims, 5 Drawing Sheets

(51) Int. Cl.
  H04N 9/82     (2006.01)
  G11B 20/00    (2006.01)
  G06F 17/30    (2006.01)
  G06K 9/00     (2006.01)
  H04N 21/422   (2011.01)
  H04N 21/81    (2011.01)
  G11B 27/031   (2006.01)
  G11B 27/10    (2006.01)
  G11B 27/32    (2006.01)
  H04N 5/247    (2006.01)

(52) U.S. Cl.
  CPC .... H04N21/42202 (2013.01); H04N 21/8133 (2013.01); *H04N 5/247* (2013.01); *H04N 5/772* (2013.01)

(56) References Cited

U.S. PATENT DOCUMENTS

| | | |
|---|---|---|
| 2008/0246841 A1 | 10/2008 | Chen et al. |
| 2009/0009605 A1 | 1/2009 | Ortiz |
| 2009/0041298 A1 | 2/2009 | Sandler et al. |
| 2009/0063097 A1 | 3/2009 | Vock et al. |
| 2010/0268459 A1 | 10/2010 | O'Shea |
| 2011/0071792 A1 | 3/2011 | Miner |
| 2011/0208822 A1* | 8/2011 | Rathod ............ G06Q 30/02 709/206 |
| 2012/0113274 A1 | 5/2012 | Adhikari et al. |
| 2013/0176401 A1* | 7/2013 | Monari ............ H04N 5/2252 348/47 |
| 2013/0330054 A1 | 12/2013 | Lokshin |
| 2014/0028855 A1 | 1/2014 | Pryor |
| 2014/0257744 A1 | 9/2014 | Lokshin et al. |
| 2015/0340066 A1 | 11/2015 | Lokshin et al. |

FOREIGN PATENT DOCUMENTS

| | | |
|---|---|---|
| JP | 2005286377 | 10/2005 |
| JP | 2005286394 | 10/2005 |
| JP | 2006345270 | 12/2006 |
| JP | 2009065324 | 3/2009 |
| JP | 2012008683 | 1/2012 |
| JP | 2012512608 | 5/2012 |
| JP | 2012523900 | 10/2012 |
| JP | 2013130808 | 7/2013 |
| WO | 2007006346 | 1/2007 |
| WO | 2010025467 | 3/2010 |
| WO | 2011069291 | 6/2011 |
| WO | 2014073454 | 5/2014 |

OTHER PUBLICATIONS

International Patent Application PCT/US2015/047251, International Search Report and Written Opinion, Dec. 16, 2015.
International Patent Application No. PCT/US2016/018291, International Search Report and Written Opinion, Apr. 26, 2016.
The Extended European Search Report 13804492.0, Nov. 20, 2015.

* cited by examiner

AUTOMATIC SELECTION OF VIDEO FROM ACTIVE CAMERAS

This application is a continuation of U.S. application Ser. No. 13/734,818 entitled "AUTOMATIC DIGITAL CURATION AND TAGGING OF ACTION VIDEOS," filed Jan. 4, 2013, which claims priority to U.S. Provisional Patent Application Ser. No. 61/689,654, filed Jun. 11, 2012 entitled "Auto Digital Curation And Tagging Of Action Videos," the entire disclosures of which are hereby incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of devices for recording video, and in particular to methods and apparatuses for automatic digital curation and tagging of action videos.

BACKGROUND

The wide availability of portable cameras has led to an explosion of short self-made and professional videos. Many of these videos, especially made with POV (Point Of View) action cameras, are related to action sports such as downhill skiing, snowboarding, surfing, mountain biking, etc. The YouTube web site, for example, contains thousands of such videos.

At the same time, the very number and popularity of these videos created its own problem. Firstly, it has become very difficult to find a video of interest when the event of interest is not explicitly associated with the video by its creators. Secondly, since most of the videos are made by amateurs and are not edited, users have to watch the entire video even if they are interested only in some particular portion of it e.g. when a snowboarder jumps or a skier has a particularly fast portion of a run, or any other particular events within a larger video.

At the same time the wide popularity of portable devices with GPS and other sensors allows accurate measurement, storage, and classification of action sport activities. Therefore, if video and performance data can be synchronized in time and space then video footage can be annotated, edited, selected, and tagged based on the performance matrix of a particular activity that was filmed.

A person searching or viewing such video may desire to find particular video or portions of a video. For example, such person may want to search for video that shows snowboarding jumps with air time longer than one second. However, this would be impractical or impossible using the currently available means for video tagging which typically use only semantic and text video descriptions.

Another issue associated with many action videos is that they are made by one person and performance data for the video "subject" are collected by the sensors collocated with the video subject who is a different person.

Attempts have been made to mark video during capture for quick selection. However, such solutions typically use tags that are based on text that is created by others or found in the video.

U.S. Pat. No. 7,624,337 and U.S. Pat. No. 7,823,055 disclose a solution that uses text, including text in the video, to create tags and meta data for later use in video searching.

U.S. Pat. No. 5,832,171 to Heist, et al. describes synchronization of video and text where the text was created for the video.

U.S. Pat. No. 4,873,585 to Blanton et al teaches a system that allows selection of images of particular motions from a video to allow easy access to these images. However, this requires operator intervention and decision making.

U.S. Pat. No. 7,483,049 to Aman et al. discloses creation of a database of videos of sport motions. However, the video has to be created in a very controlled environment by multiple cameras with athletes marked with visible or invisible markers that can be identified in the video.

There is also a body of work on triggering video by particular events, mostly traffic violations. U.S. Pat. No. 7,986,339 to Higgins describes a system capable of recording and analyzing still and video images of a traffic violation. However, the video recording is triggered by an outside physical signal that is generated by a vehicle, e.g. laser or Doppler radar. U.S. Pat. No. 6,919,823 to Lock and U.S. Pat. No. 7,633,433 to Behrens are similar, with a triggering signal generated by a red light change or a laser beam interrupted after the red light change.

In addition, in the above cases, the relative position of a camera and the video subject are known in advance, and so the solution does not provide any time and space domain search to match the event and the video footage.

SUMMARY

In an embodiment, the present disclosure provides a method and a system that allows synchronization of the video and the corresponding performance data, and then tagging and/or editing of the video based on the performance data. The video and the performance data can be collected by a collocated device (i.e., the same device) or different devices and different users. The video and performance data could also be stored in the same device or be stored in different devices or databases. The invention can thus provide matching of video and performance data from different data sets or different databases and then automatic editing, annotation, and tagging of the video. This can be done even if the video and performance data were recorded independently and without explicit knowledge of other activity.

A method according to one embodiment includes: receiving, by a processing system, sensor data from a sensor device carried by a user or attached to the user's sports equipment during a sporting activity; identifying, by the processing system and based on the sensor data, an event engaged in by the user during a time period; determining, based on the sensor data, a position of the user during the event; identifying a camera that is operational and has the user in view during at least a portion of the time period; and selecting video footage of the event from the identified camera.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings.

The present invention is described below with reference to block diagrams and operational illustrations of a system and method for automatic digital curation and tagging of action videos. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In an embodiment, a user is equipped with a sensor-based device that records his/her motions. The sensor-based device may be, e.g., a portable device that includes GPS and inertial sensors. Also provided is a processing system, which may be embedded in the sensor-based device, may be a separate device, or may be server-based, that is capable of detecting such events as jumps, flips, rotations, high speed, fast turns, etc. As a result, a detailed record of the motions with detailed trajectory, speed, acceleration, jumps, tricks, etc. is created and stored in a performance database. Also provided is a video camera for which location, time, and, optionally, direction information are known for the time when video is taken. The camera may be collocated with the sensors, or may be an independent device.

Figure 1:
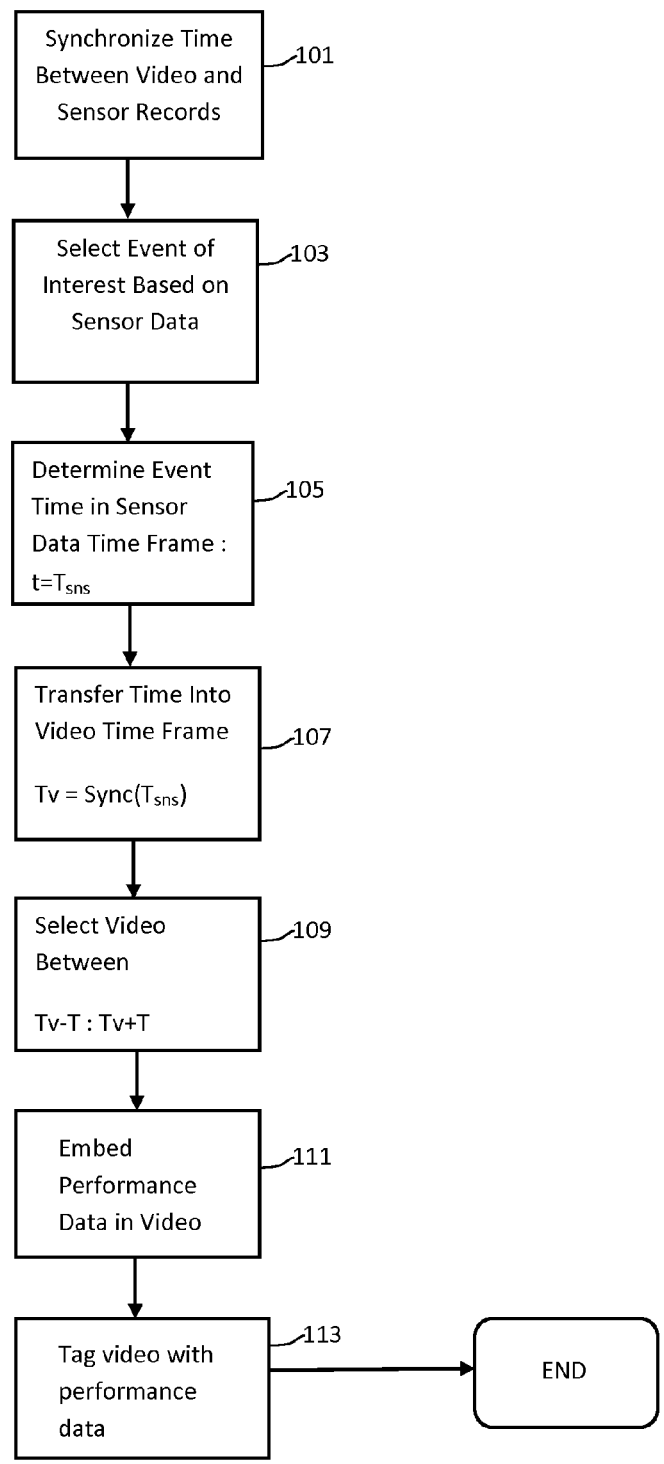
FIG. 1 shows a flowchart illustrating an embodiment of a method for automatic selection of a desired portion of video footage from an action video when sensors are collocated with the video camera.

The following is a non-limiting example of the operation of the system and method in accordance with an embodiment of the invention. A video camera records a sports activity that occurs between time $t=T_{start}$ and $t=T_{end}$. In this example, the same activity performance parameters have also been recorded using a set of sensors. A particular event of interest, e.g. a jump, is detected using sensory data at time $t=t_k$, $T_{start}<t_k<T_{end}$. Then, if sensory data and video are time-synchronized, the video footage of the event of interest can be cut out between time $t_{k-T}$ and $t_{k+T}$ where T is a half period of the desired video footage. In an embodiment, if video is shorter than a desired time 2 T, then the entire video is used. Time synchronization between video and sensor data can be conducted using GPS Time stamps, or wireless network time stamps, or any other method known to those who are proficient in the art FIG. 1 shows a flowchart illustrating an embodiment of a method for automatic selection of a desired portion of video footage from an action video when sensors are collocated with the video camera. Time and position coordination allows a system to automatically associate video footage and sport performance. If camera position, direction, and focus length are known, then a more sophisticated paring between video and sensory data can be made. The method begins with a step 101 wherein time is synchronized between video and sensor records. At step 103, an event of interest is selected based on sensor data. This event may be, e.g., a jump, a flip, a rotation, a high speed portion, a turn, a fast turn, or any other finite portion of a user's performance that may be of interest. At step 105, the processing device automatically determines where the event of interest occurs in the sensor data, with $t=T_{sns}$. Various systems and methods for identifying an event of interest in sensor data are taught, for example, in U.S. patent application Ser. No. 13/612,470 entitled "Method and Apparatus for Determining Sportsman Jumps Using Fuzzy Logic" filed Sep. 12, 2012, the entire disclosure of which is incorporated herein by reference.

With continued reference to FIG. 1, at step 107, the time determined in step 105 above is transferred into the time frame of video in the video database such that Tv=Sync ($T_{sns}$). Then, at step 109, the video between Tv−T:Tv+T is selected. Performance data is then embedded (displayed, annotated) in the video data at step 111. The video data may be automatically tagged with performance data at step 113. The automated tagging may include user name, event time and location, and the key performance characteristics such as speed, slope value, jump time and/or height, flip angle, or trade name, etc. Alternatively, or in addition, the video may then be automatically edited step 111 is complete.

It will be understood by those skilled in the art that a similar operation can be done by selecting an appropriate performance segment when a video is short and a performance record covers a much longer overlapping time period.

Figure 2:
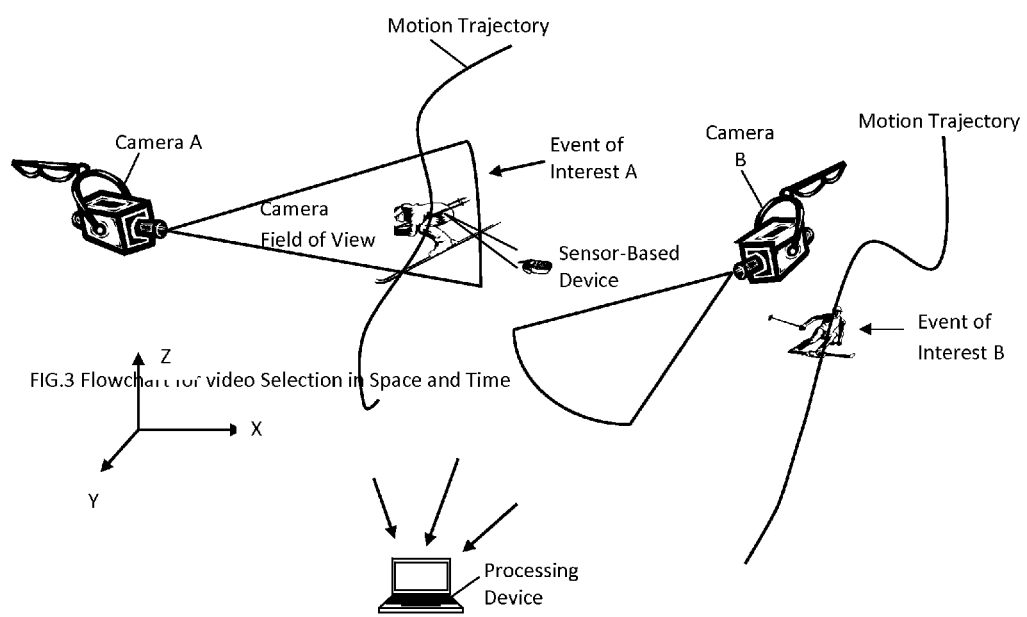
FIG. 2 shows a three-dimensional diagrammatic view illustrating a scenario in which a skier's trajectory crosses a field of view of Camera A but does not cross a field of view for Camera B.

FIG. 2. shows a three-dimensional diagrammatic view illustrating a scenario in which a skier's trajectory crosses the field of view of Camera A but does not cross the field of view for Camera B. If an event of interest occurs during the time that camera A is operational then the appropriate footage can be identified and selected. The trajectory of Event B does not cross any camera field of view, and cannot be synchronized. This implementation illustrates a possible case where multiple unattended cameras constantly record any activity in their field of view and then a video of interest is auto selected based on the performance, time, and location data that are collected separately.

Figure 3:
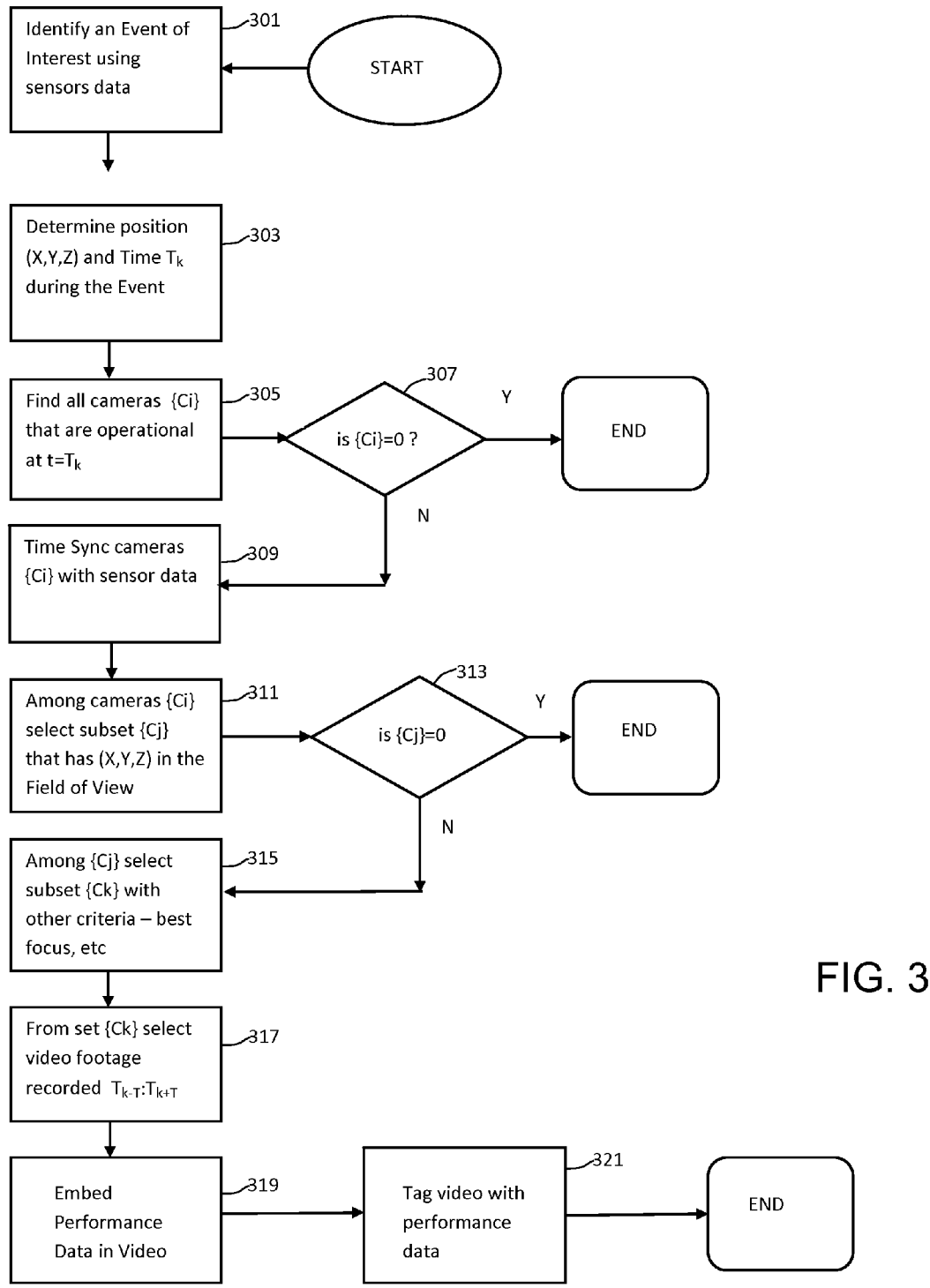
FIG. 3. shows a flowchart illustrating an embodiment of an appropriate algorithm which searches a database of active cameras.

FIG. 3. shows a flowchart illustrating an embodiment of an appropriate algorithm which searches a database of active cameras. At step 301, an event of interest is identified using sensor data. As noted above, such event may be, a jump, a flip, a rotation, a high speed portion, a turn, a fast turn, or any other finite portion of a user's performance that may be of interest. Once the event is identified, at step 303 the processing system determines the geographic position and time duration of the event. At step 305, the processing system finds all cameras that are operational at time $T_k$ (determined in step 303 above). If there are no cameras operational, as determined at step 307, the process ends. Otherwise, the process proceeds to step 309, in which operational cameras or camera data are time synchronized with sensors or sensor data. Once the operational cameras or their data are time synchronized with sensors or sensor data, the process proceeds to select, at step 311, a subset of the cameras that has the position of the event (as determined above in step 303) in their field of view. If there are no such cameras, as determined at step 313, the process ends. Among the previously selected subset of cameras, a further subset of cameras is selected at step 315, this further subset being those cameras or camera data that meet other criteria. Examples of such other criteria include, e.g., the camera that has the best focus. From the further subset of cameras, the video footage recorded at time $T_{k-T}:T_{k+T}$ is selected at step 317. At step 319, the performance data for the event of interest, or for all of the performance, is embedded into the video data. Finally, the video data is tagged with performance data as well as with other information—time, location, user, at step 321.

Figure 4:
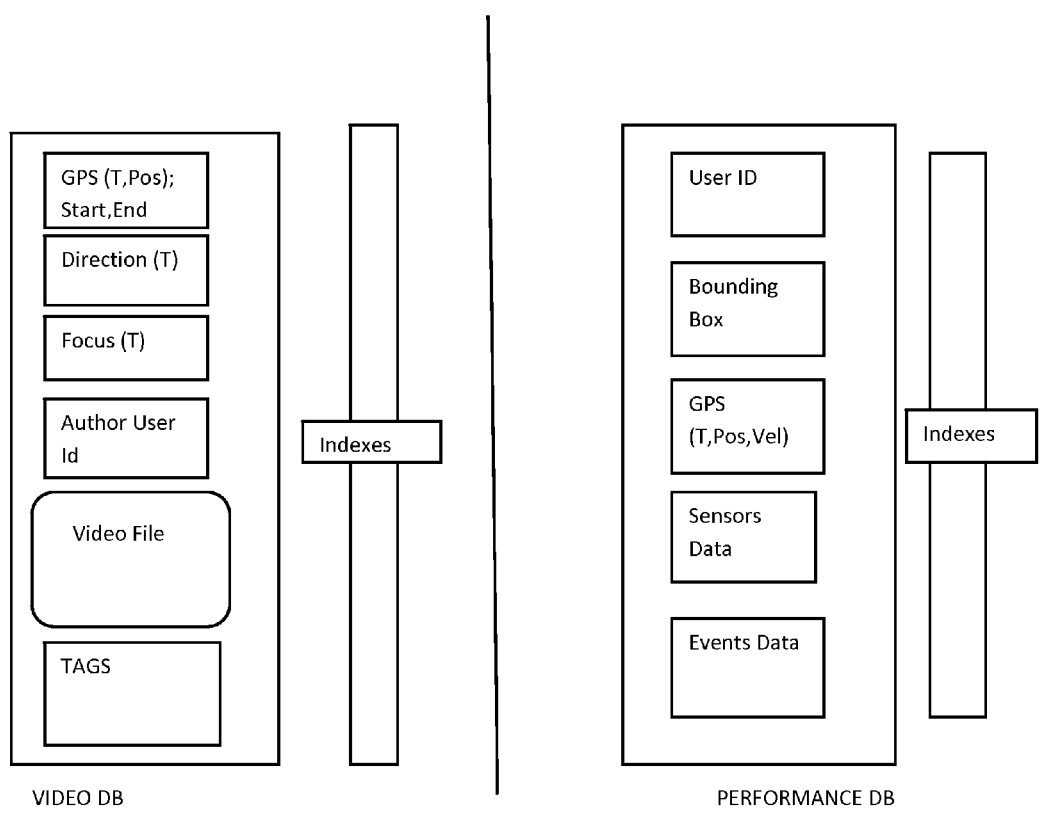
FIG. 4. shows a block diagram illustrating organization of the video and performance databases in accordance with an embodiment of the invention.
Figure 5:
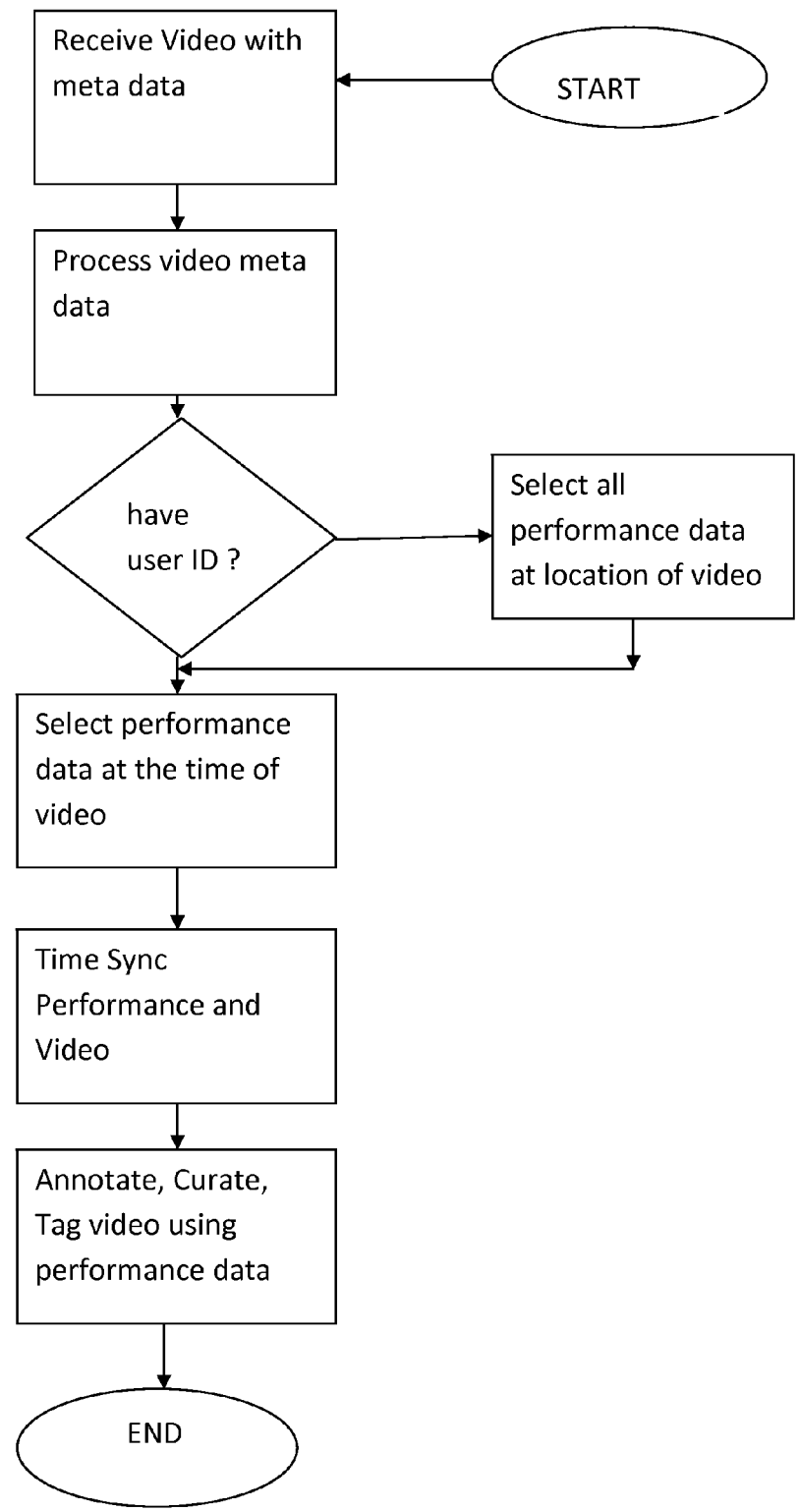
FIG. 5 shows a flowchart illustrating a process for using performance meta data for search simplification.

FIG. 4. shows a block diagram illustrating an example of the organization of the video and performance databases in accordance with an embodiment of the invention. FIG. 5 shows a flowchart illustrating a process for using performance meta data for search simplification.

Thus, an embodiment of the presently disclosed system and method allows editing, annotation, and searching of an individual video or a video library by performance characteristics. A subject selection can be further refined by selecting performance data from the users that belong to a particular subgroup, say "friends". Suppose several users have performance data trajectory that corresponds to a particular video clip. However, only one user among them belongs to the "friends" subgroup of the person who made the video. Then the performance data of this "friend" can be automatically selected to be synchronized with the video. This resolves a common situation wherein a person records a video of his or her friends and other people activity are also recorded in the frame. The automatic selection in accordance with various embodiments of the invention can further improve the performance of the system and simplifies the process of video creation.

The processing steps described herein may be performed on one or more computing devices. For example, the steps may be performed on any combination of (a) a portable data collection device carried by the user, (b) a portable video recording computing device carried by a spectator at a sporting event or by a user participating in the event, or (c) a remote server computing device. An example of portable data collection devices is a portable computing device or smartphone with an accelerometer and GPS capability therein. Examples of a portable video recording computing device include a video camera with processing capability, or a smart phone with video recording hardware and software. Each such computing device may comprise, e.g., a processor for carrying out instructions; computer readable media such as static memory and/or dynamic memory for storing computer program instructions; input means such as a touch screen, keyboard, voice input, mouse, or the like; a network interface for communicating over a wireless and/or wired network, and a user interface such as a display, speaker, and hard or soft buttons. The portable data collection device may further include an accelerometer, such as a three-axis accelerometer, and may also include a GPS receiver and the capability to determine its position using the same. The remote server computing device may be a device that is remote from the portable data collection device. For example, server or desktop computer may be provided and process raw or preprocessed accelerometer data from the portable data collection device. The transmission of data from a portable data collection device to the computing device or to the remote server computing device may be performed via a wireless and/or wired network interface associated with the portable data collection device and a wireless and/or wired network interface associated with the remote server or remote desktop computer.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A computer-implemented method, comprising:
   receiving, by a processing system, sensor data from a sensor device carried by a user or attached to the user's sports equipment during a sporting activity;
   identifying, by the processing system and based on the sensor data, an event engaged in by the user during a time period;
   determining, based on the sensor data, a position of the user during the event;
   identifying a camera that is operational and has the user in view during at least a portion of the time period; and
   selecting video footage of the event from the identified camera.

2. The method of claim 1, further comprising synchronizing video from the identified camera with the received sensor data.

3. The method of claim 2, wherein the sensor data includes data from a GPS sensor, and synchronizing the video from the identified camera with the received sensor data is conducted using GPS time stamps.

4. The method of claim 2, wherein synchronizing the video from the identified camera with the received sensor data is conducted using wireless network time stamps.

5. The method of claim 1, wherein identifying the camera includes:
   identifying a plurality of cameras that are operational during the time period; and
   identifying a subset of the operational cameras that have the user in view during the time period; and
   selecting a camera from the subset of operational cameras based on at least one criteria.

6. The method of claim 5, wherein the at least one criteria includes a focus level of each camera in the subset.

7. The method of claim 1, further comprising embedding performance data related to the event in the selected video footage.

8. The method of claim 1, further comprising tagging the selected video footage with one or more of: performance data related to the event, time information, location information, and information regarding the user.

9. The method of claim 1, wherein the sensor data includes inertial data.

10. The method of claim 1, wherein the sensor data includes at least one of: position data and time data.

11. The method of claim 1, wherein the identified event is selected from the group consisting of: a jump, a flip, a rotation, a high speed portion, a turn, and a fast turn.

12. The method of claim 1, wherein the sensor device is a portable device comprising at least one GPS sensor and at least one inertial sensor.

13. The method of claim 1, wherein the processing system is embedded in the sensor device.

14. The method of claim 1, wherein the processing system is a separate device from the sensor device.

15. The method of claim 1, wherein the processing system comprises a server.

16. The method of claim 1, wherein the sensor device is co-located with a camera that generates said video data.

17. The method according to claim 1, wherein the sensor device is separate and independent from the camera that generates the video footage.

18. A system, comprising:
a processor; and
memory coupled to the processor and storing instructions that, when executed by the processor, cause the system to:
receive sensor data from a sensor device carried by a user or attached to the user's sports equipment during a sporting activity;
identify, based on the sensor data, an event engaged in by the user during a time period;
determine, based on the sensor data, a position of the user during the event;
identify a camera that is operational and has the user in view during at least a portion of the time period; and
select video footage of the event from the identified camera.

19. A computer program product comprising a non-transitory computer readable storage medium storing instructions that, when executed by a computing device, cause the computing device to:
receive sensor data from a sensor device carried by a user or attached to the user's sports equipment during a sporting activity;
identify, based on the sensor data, an event engaged in by the user during a time period;
determine, based on the sensor data, a position of the user during the event;
identify a camera that is operational and has the user in view during at least a portion of the time period; and
select video footage of the event from the identified camera.

* * * * *